(12) United States Patent
Nasielski

(10) Patent No.: US 7,336,949 B2
(45) Date of Patent: Feb. 26, 2008

(54) INTERNATIONAL DIALING FOR WIRELESS NETWORKS

(75) Inventor: John W. Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/315,673

(22) Filed: Dec. 9, 2002

(65) Prior Publication Data

US 2004/0203757 A1 Oct. 14, 2004

(51) Int. Cl.
*H04Q 7/20* (2006.01)
(52) U.S. Cl. ............ 455/435.1; 455/433; 455/432.1
(58) Field of Classification Search ......... 455/433, 455/432, 456.1, 564, 566, 432.1, 461, 432.2, 455/456.2, 456.6, 435.1; 379/219, 229, 221.13, 379/221.14, 221.08
See application file for complete search history.

(56) References Cited

U.S. PATENT DOCUMENTS

| | | | |
|---|---|---|---|
| 5,216,709 A * | 6/1993 | Wen et al. ............... 379/354 |
| 5,978,678 A * | 11/1999 | Houde et al. ............ 455/433 |
| 6,134,319 A * | 10/2000 | Burg et al. .............. 379/354 |
| 6,192,124 B1 * | 2/2001 | Yim ...................... 379/355.08 |
| 6,259,914 B1 * | 7/2001 | Koster .................... 455/432.1 |
| 6,345,184 B1 | 2/2002 | Van der Salm et al. |
| 6,490,449 B1 * | 12/2002 | Thibert et al. ........... 455/433 |
| 6,526,267 B1 * | 2/2003 | Jokimies et al. ......... 455/161.1 |
| 6,587,688 B1 * | 7/2003 | Chambers et al. ........ 455/433 |
| 6,625,457 B1 * | 9/2003 | Raith ..................... 455/456.1 |
| 6,704,566 B1 * | 3/2004 | Besharat et al. ......... 455/414.1 |
| 6,751,481 B2 * | 6/2004 | Chen et al. .............. 455/564 |
| 6,751,483 B1 * | 6/2004 | Oh ......................... 455/566 |
| 6,782,278 B2 * | 8/2004 | Chen et al. .............. 455/564 |
| 6,871,069 B1 * | 3/2005 | Cho ........................ 455/433 |
| 6,941,159 B2 * | 9/2005 | Tsai et al. ................ 455/564 |
| 2002/0107017 A1 * | 8/2002 | Song ....................... 455/432 |
| 2003/0100334 A1 * | 5/2003 | Mazzara, Jr. ............ 455/552 |

FOREIGN PATENT DOCUMENTS

| | | |
|---|---|---|
| DE | 196 23 299 A1 | 1/1998 |
| EP | 0 526 832 A2 * | 7/1992 |
| EP | 0526832 | 2/1993 |
| WO | WO 01/63959 A1 * | 8/2001 |

* cited by examiner

*Primary Examiner*—Temica Beamer
(74) *Attorney, Agent, or Firm*—Thomas R. Rouse; Sandra L. Godsey; Kristine U. Ekwueme

(57) ABSTRACT

Systems and techniques are disclosed relating to international communications over a network. The systems and techniques involve retrieving information from a network, identifying an international access code related to the retrieved information, and placing an international call through the network using the international access code. Alternatively, the international access code may be retrieved directly from the network. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or the meaning of the claims.

36 Claims, 5 Drawing Sheets

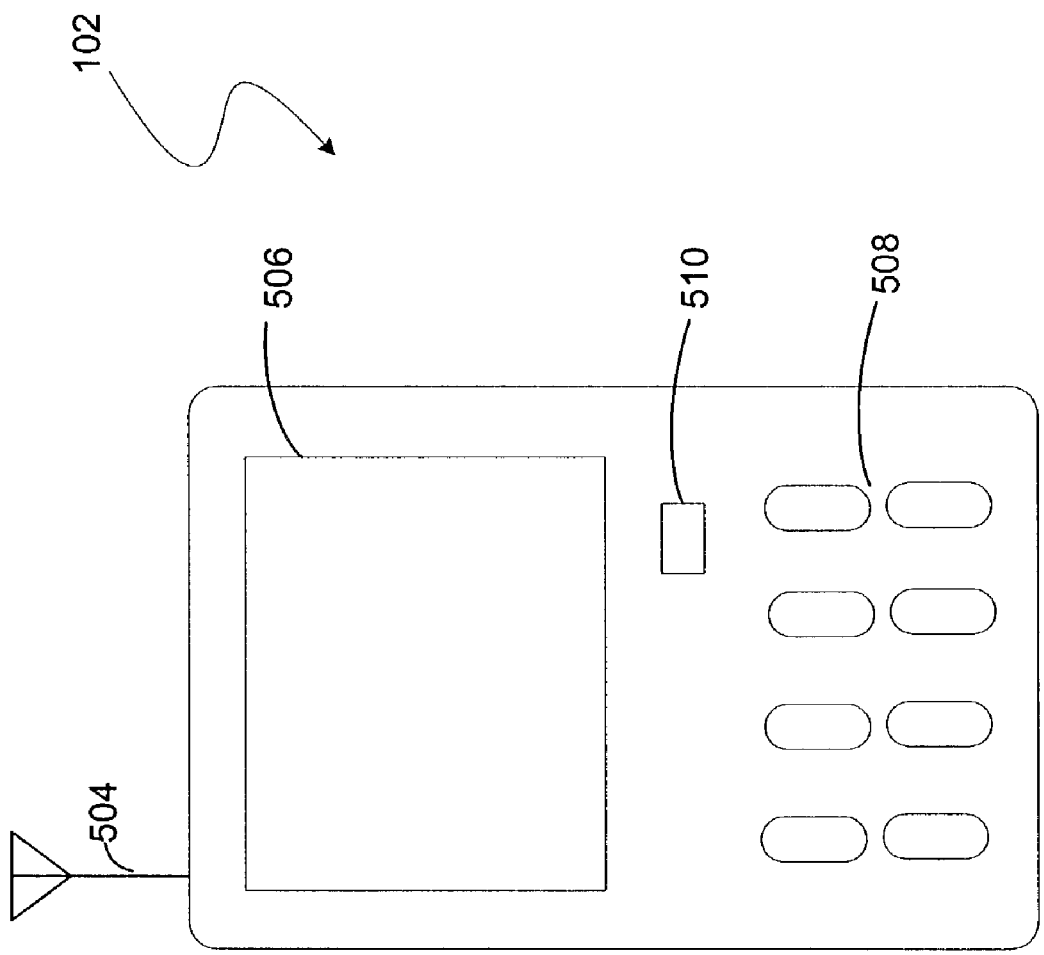

INTERNATIONAL DIALING FOR WIRELESS NETWORKS

FIELD

The present invention relates generally to communications, and more specifically, to systems and techniques for supporting international dialing while roaming across multiple network platforms in a wireless communications system.

BACKGROUND

Roaming is the ability to make and receive calls outside of a user's home network. International roaming, more specifically, is the ability make and receive calls from a foreign country, using the user's own handset and the foreign country's wireless network. Typically, international roaming requires a user to dial an international access code to reach a telephone number outside of the country where the user is located. International access codes are specific to each country and, in some cases, to the carrier whose network supports the call. For example, a user in the United States must dial "011" on his handset in order to use the international roaming feature to place an international call. A user in France would dial "00," "40," or "70," or another international access code, depending on which carrier he chooses to utilize, in order to place an international call from France. Therefore, users who frequently travel must keep track of a variety of different international access codes in order to use their handsets to make phone calls in different countries. Because many countries have different international access codes, and because the international access codes within a single country may vary according to carrier, accurate knowledge of the codes may be a significant burden on travelers.

Many European countries utilize the Global System for Mobile Communications (GSM) standard for wireless networks. GSM supports an international dialing feature in which users may dial a (+) key on their handset in lieu of dialing the international access code. Dialing the (+) key marks the call as an international call, instructing the local switching system to route the call to an international switch. Unfortunately, users whose handsets include the GSM-supported (+) key cannot utilize this function in areas that are not covered by a GSM network. For example, code division multiple access (CDMA) systems do not recognize or support the mark accompanied by a call that has been placed with a (+) key, and are therefore unable to route it to an international switch. Instead, in order to route an international call, CDMA systems require the appropriate international access code to accompany the call.

With the tremendous increase in wireless communications over the past years, there has been a demand for simpler access procedures when roaming internationally. However, there currently does not exist an automated international dialing feature allowing users to engage in international roaming, regardless of the network supporting the call, without knowing and entering the proper international access code.

SUMMARY

In one aspect of the present invention, a method of communications includes retrieving information from a network, identifying an international access code related to the retrieved information, and placing an international call through the network using the international access code.

In another aspect of the present invention, a method of communications includes retrieving an international access code from a network and placing an international call through the network using the international access code retrieved from the network.

In yet another aspect of the present invention, computer readable media embodies a program of instructions executable by a computer program to perform a method of communications including retrieving information from a network, identifying an international access code related to the retrieved information, and placing an international call through the network using the international access code.

In a further aspect of the present invention, computer readable media embodies a program of instructions executable by a computer program to perform a method of communications including retrieving an international access code from a network and placing an international call through the network using the international access code retrieved from the network.

In yet a further aspect of the present invention, a communications apparatus includes retrieving means for retrieving information from a network, identifying means for identifying an international access code related to the retrieved information, and means for placing an international call through the network using the international access code.

In yet another aspect of the present invention, a communications apparatus includes retrieving means for retrieving an international access code from a network and means for placing an international call through the network using the international access code retrieved from the network.

In still another aspect of the present invention, a communications apparatus includes a processor configured to retrieve information from a network, identify an international access code related to the retrieved information, and place an international call through the network using the international access code.

In a further aspect of the present invention, a communications apparatus includes a processor configured to retrieve an international access code from a network, and place an international call through the network using the international access code retrieved from the network.

It is understood that other embodiments of the present invention will become readily apparent to those skilled in the art from the following detailed description, wherein it is shown and described only embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 5 illustrates an embodiment of a subscriber station that may be configured to identify an international access code during registration of the subscriber station to a local network.

DETAILED DESCRIPTION

The detailed description set forth below in connection with the appended drawings is intended as a description of embodiments of the present invention and is not intended to represent the only embodiments in which the present invention may be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In the following detailed description, various techniques will be described in the context of a CDMA communications system. While these techniques may be well suited for use in this environment, those skilled in the art will readily appreciate that these techniques are likewise applicable to other wireless networks. Accordingly, any reference to a CDMA communications system is intended only to illustrate various inventive aspects of the present invention, with the understanding that these inventive aspects have a wide range of applications.

Figure 1:
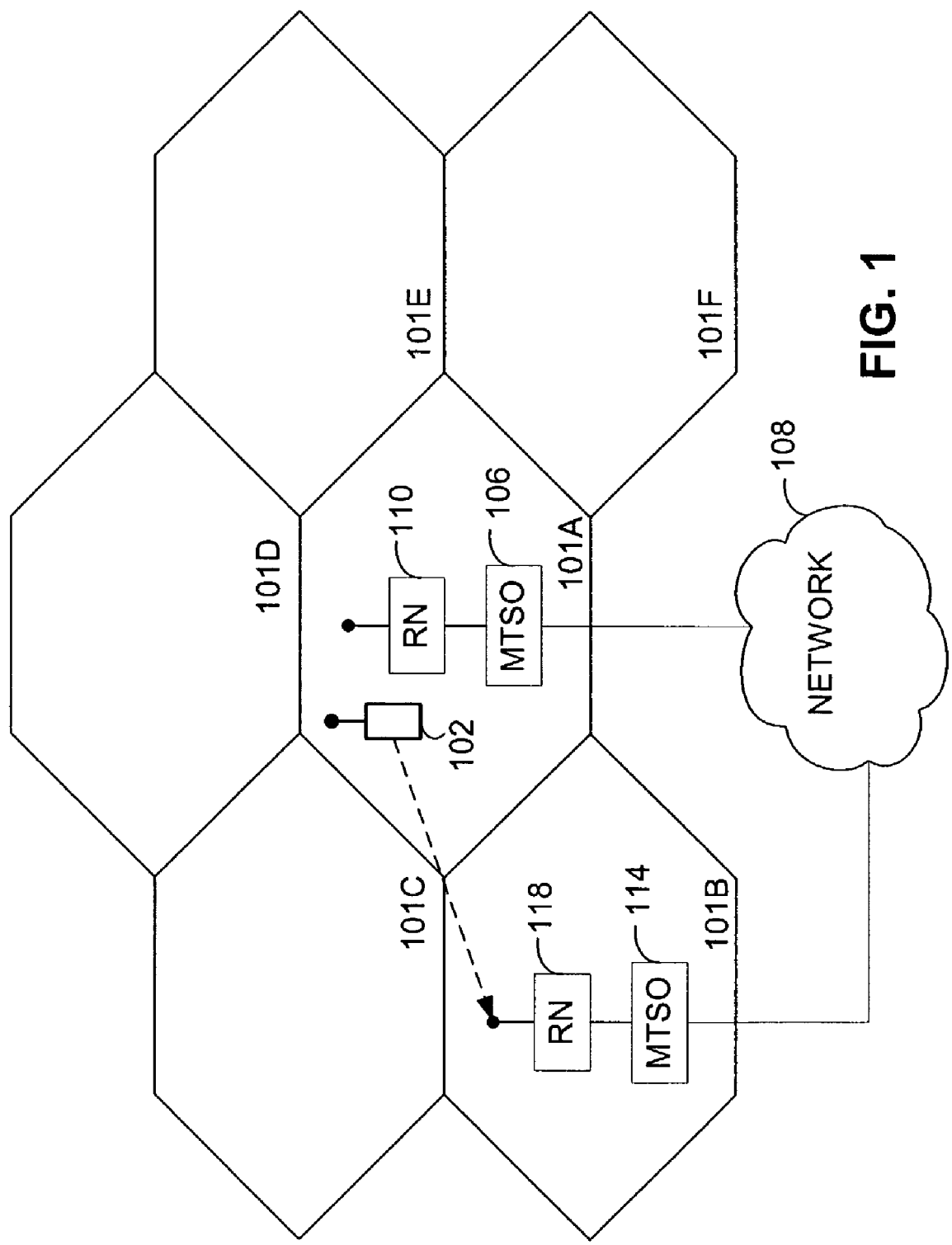
FIG. 1 is a conceptual block diagram of a CDMA communications system.

FIG. 1 is a conceptual block diagram of a CDMA communications system. The CDMA communications system is shown with a number of networks 101a-f. A subscriber station 102 is shown moving through different networks by a series of broken lines. The subscriber station 102 is shown initially in its home network 101a. The home network 101a may include one or more radio controllers for establishing and maintaining a wireless connection with all the subscriber stations in the home network 101a. A radio network may be defined as a collection of base stations and one or more base station controllers. For ease of explanation, only one radio network 110 is shown. The home network 101a may also include a mobile telephone switching office (MTSO) 106 which interfaces the radio network 110 to a wide area network (WAN) 108 such as a land-based public switched telephone network (PSTN) and/or a packet data based network.

As the subscriber station 102 moves through the home network 101a, it may communicate with other subscriber stations (not shown), or access the WAN 108, through the radio network 110. This may be accomplished by establishing a wireless link between the subscriber station 102 and the radio network 110 through a registration process. The registration process includes the transmission of a system identification code (SID) from the radio network 110 to the subscriber station 102 on an overhead channel. When the subscriber station receives the SID, it compares it to the SID programmed into the subscriber station 102. If the SIDs match, the subscriber station 102 knows that it is in communication with a radio network 110 from its home network 101a.

Once the subscriber station 102 receives the SID, it transmits a registration request to the radio network 110. The registration request may be used to report the location of the subscriber station 102 within the home network 101a to the MTSO 106. The MTSO 106 stores this information in a database. The database allows the MTSO to intelligently route calls to the subscriber station 102 without having to page the subscriber station 102 throughout the entire home network 101a. In response to the registration request, various system parameters may be sent back from the MTSO 106 to the subscriber station 102 via the radio network 110.

As the subscriber station 102 moves out of its home network 104, it will generally need to register with a new network. In the embodiment shown in FIG. 1, the subscriber station 102 is shown moving from its home network 101a into a foreign network 101b. The foreign network 101b will be referred to as a local network as long as the subscriber station 102 remains in that foreign network. During the registration process, the subscriber station 102 will receive a SID from a radio network 118 of foreign network 101b. However, unlike the registration process in the subscriber station's home network 101a, the SID from the radio network 118 will not match the SID programmed into the subscriber station 102. Because of the mismatch, the subscriber station 102 will recognize that it is outside its home network 101a and is, therefore, roaming. The subscriber station 102 then transmits a registration request to a MTSO 114 in the local network 101b through the radio network 118. The registration request includes the SID programmed into the subscriber station 102. The SID provides an indication to the MTSO 114 in the local network 101b that the subscriber station 102 is roaming. The MTSO 114 uses the SID to identify the home network 101a of the subscriber station 102. The MTSO 114 may then contact the MTSO 106 in the subscriber station's home network 101a for verification of the subscriber station 102. Once verified, various system parameters may be sent back from the MTSO 114 to the subscriber station 102 via the radio network 118 to complete the registration process.

In at least one embodiment, the system parameters may include the international access code for the local network. By including the international access code in the system parameters obtained during registration, a user on a subscriber station in a foreign network may place an international call without having to know the international access code for that network. For example, when the subscriber station 102 travels into a foreign network 101b with an international access code different from the user's home network 101a, the user may nonetheless place an international call from the foreign network 101b by merely activating an international call key on the subscriber station 102. In response, the subscriber station 102 may append the international access code obtained during registration to the telephone number dialed by the user before transmission to the radio network 118 for appropriate routing. Alternatively, the subscriber station 102 may be configured to derive the international access code from information received from the MTSO 114 in the local network 101b during registration. The information may be location information that identifies the geographic location of the local network 101b such as a SID or a country code.

Figure 2:
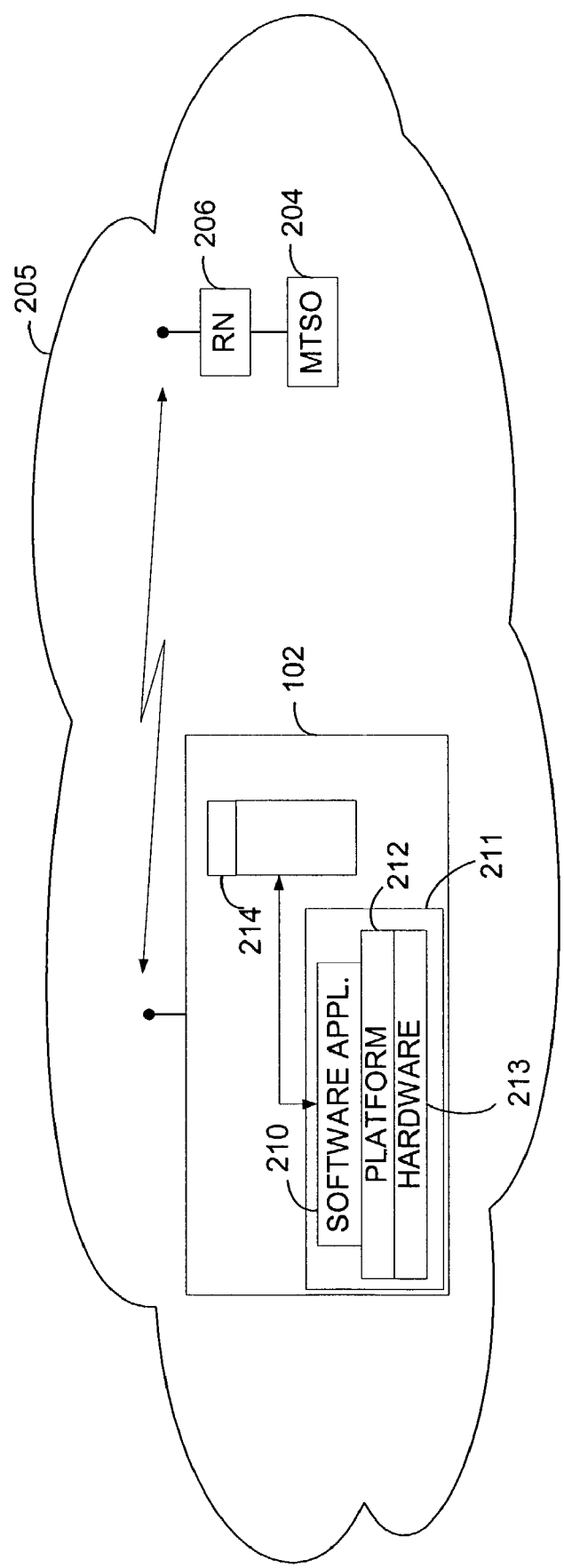
FIG. 2 is a simplified functional diagram illustrating software components within a subscriber station configured to determine an international access code during registration.

FIG. 2 is a simplified functional diagram illustrating software components within a subscriber station configured to determine an international access code when registering with a foreign network. As described above, various parameters may be acquired during registration. One such parameter, in an embodiment, may include the geographic location of the local network 205. When the subscriber station 102 registers with an MTSO 204, the geographic location of the local network 205 may be routed through a radio network 206 to the subscriber station 102, where a software application 210 utilizes the location information to generate an international access code.

The subscriber station 102 may include a processor 211 comprising a general purpose or specific application processor 213 supporting a software platform 212 such as, for example, the BREW® operating system developed by Qualcomm, Inc. The software platform 212 may be used to run the software application 210. The specific software platform 212 used in the processor 211 may depend on a variety of factors such as the hardware within the subscriber station, the requirements of software applications to be utilized by the subscriber station, and/or various other preferences of manufacturers of the subscriber station. In alternative embodiments, the processor 213 may be implemented with an application specific integrated circuit (ASIC), a field programmable gate array (FPGA) or other programmable logic device, discrete gates, transistor logic, discrete hardware components, or any other equivalent or nonequivalent structures that may perform one or more of the functions described herein.

The software application 210 may be configured to access a lookup table 214 to identify an international access code according to the location information retrieved from radio network 206 during registration. The lookup table 214 may be, for example, a mapping table, a text file, a data matrix, or other data structure or software file that may be utilized by the software application 210. The lookup table 214 may be configured to correlate location information to international access codes. Thus, once the location of the local network 205 is retrieved from the MTSO 204, the location information may be utilized by the software application 210 residing in or in communication with the subscriber station 102 to determine the appropriate international access code for placing an international telephone call. The software application 210 is then employed to append the received international access code to an international telephone number dialed on the subscriber station 102 by its user.

Figure 3:
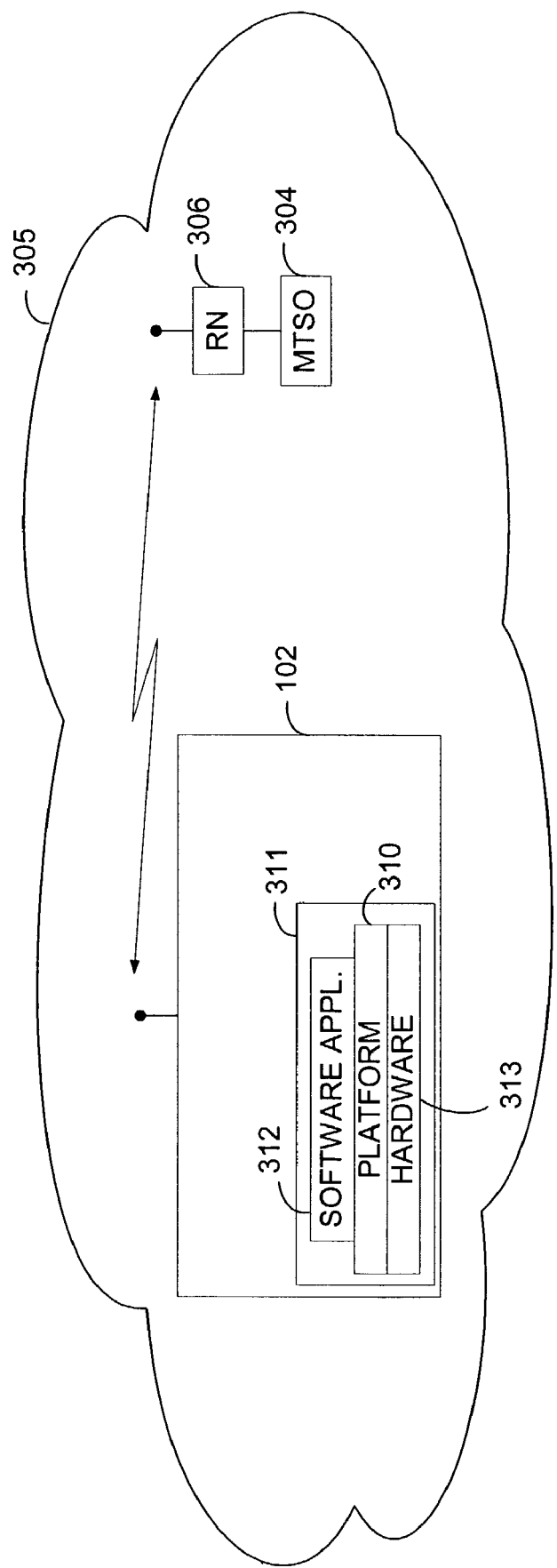
FIG. 3 is a simplified functional diagram illustrating alternative software components within a subscriber station configured to determine an international access code during registration.

FIG. 3 is a simplified functional diagram illustrating alternative software components within a subscriber station configured to determine an international access code during registration with a foreign network. In this alternative embodiment, when a subscriber station 102 registers with an MTSO 304, an international access code may be provided to the subscriber station 102 through a radio network 306. For example, if a particular international access code is the only such code utilized by local network 305 because the local network 305 extends only to a geographic region that uses that international access code, that international access code may be transmitted back to subscriber station 102 during registration. A processor 311 may then be employed to append the received international access code to an international telephone number dialed on the subscriber station 102 by its user. The processor 311 may be implemented with a software application 312 resident and operable on a software platform 310 supported by a general purpose of specific application processor 313. Alternatively, the processor 311 may be implemented with an ASIC, a FPGA or other programmable logic device, discrete gates, transistor logic, discrete hardware components, or any other equivalent or nonequivalent structures that may perform one or more of the functions described herein.

Figures 4A, 4B:
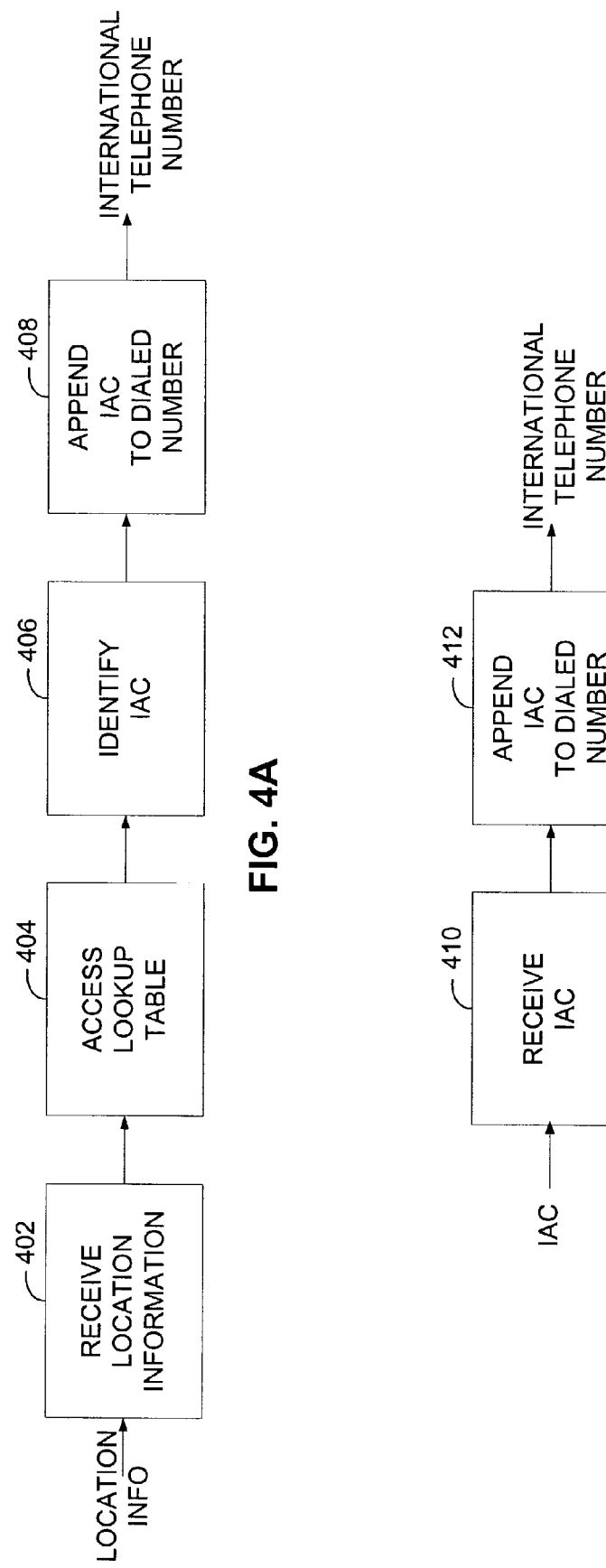
FIGS. 4A and 4B are simplified functional block diagrams illustrating features of a software application described in connection with FIGS. 3 and 4, respectively.

FIG. 4A is a simplified functional block diagram illustrating features of the software application 210 described in connection with FIG. 2. During registration of the subscriber station with a local network, location information related to the local network may be transmitted to the subscriber station and read into the software application 210 as shown at block 402. Next, at block 404, a lookup table may be accessed. As described above, the lookup table may take a number of different forms, and includes location information and corresponding international access codes. Using the received location information to reference the lookup table, the corresponding international access code may be identified at block 406. Then, the identified international access code may be appended to the telephone number dialed by a user in step 498, thereby appropriately identifying it as an international call such that it will be routed and directed accordingly.

FIG. 4B is a simplified functional block diagram illustrating features of software application 312 described in reference to FIG. 3. At block 410, an international access code specific to the local network with which the subscriber station is registering may be transmitted to the subscriber station and received by the software application 312. Then, the received international access code may be appended to the telephone number dialed by a user, thereby appropriately identifying it as an international call such that it will be routed and directed accordingly.

FIG. 5 is an embodiment of a subscriber station that may be configured to implement the systems and methods described above. The subscriber station 102 may be a handset, or other similar device, and may include, among other features, an antenna 504 for performing information retrieval and other functions during registration, a display screen 506 for displaying information to a user, a key pad 508 including number keys for enabling a user to dial a telephone number, and a key 510 for activating the international access code determination methods described above. By activating the key 510, the user signals that he or she is making an international phone call but will not be entering an international access code. This signals the subscriber station 102 to employ the international access code determination methods described above, so that the appropriate international access code may be appended to the telephone number entered by the user. The resultant phone number may then be properly identified and routed within the CDMA communications system. Note that in an alternate embodiment, the key 510 may be part of the keypad 508, such as an existing key. For example, key 510 may be the (*) key.

According to one embodiment of the invention, the mobile apparatus initiates an international call by dialing the home international dialing code. For example, for a mobile user having a home agent in the United States, the user dials the U.S. code, i.e., 011. Upon receipt of the home international dialing code, the mobile apparatus verifies the current location of the mobile apparatus based on information in the system parameter message. If the location information identifies the mobile apparatus location as outside the U.S., the mobile apparatus determines the local international dialing code for the foreign agent and applies that number in place of the home international dialing code. In this way, the user is enabled to always use the home code for international dialing irregardless of the location of the device. Alternate embodiments may implement other triggering methods and apparatus for initiating the retrieval of international dialing code information from the system. In an alternate embodiment, international dialing may be voice-activated, wherein the user gives a verbal prompt to the system, and the system in response accesses the international access code.

It will be apparent to those skilled in the art that the above two embodiments, and others, enable a user to place an international call from a foreign country without having to dial the international access code. Instead, the subscriber station determines its location (e.g. within the foreign country) during registration with a local network and utilizes a software application to identify a corresponding international access code, or retrieves the appropriate international access code from the local network itself during registration. The software application used by the subscriber station then appends the international access code to the digits of the telephone number entered by the user, and the resulting string of digits, including the international access code, is identified as an international call such that it may be supported in a CDMA communications system.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such the processor may read information from, and write information to, the storage medium. In the alternative, the storage medium may be integral to the processor. The processor and the storage medium may reside in an ASIC. The ASIC may reside in a subscriber station terminal. In the alternative, the processor and the storage medium may reside as discrete components in a subscriber station terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications, comprising:
   retrieving information from a network;
   determining whether the network is a home network from the retrieved information;
   receiving during registration with the network an international access code from the network when the network is not the home network; and
   placing an international call through the network using the international access code.

2. The method of claim 1 wherein the information is retrieved during registration with the network.

3. The method of claim 2 wherein the initiation of the international call comprises activating a key on a handset.

4. The method of claim 3 wherein the retrieval of the information is in response to the activation of the key.

5. The method of claim 2 wherein the identification of the international access code is in response to the activation of the key.

6. The method of claim 1 wherein the identification of the international access code comprises mapping the information to the international access code.

7. The method of claim 1 wherein the network comprises a CDMA network.

8. The method of claim 1, wherein determining the country where the network is located from the retrieved information comprises a system parameter message.

9. The method as in claim 8, wherein determining the country where the network is located from the retrieved information comprises a System Identifier (SID).

10. The method as in claim 9, wherein the method further comprises:
    comparing a received SID to a stored home network System Identifier (SID);
    placing an international call through the network using the international access code if the received SID is different from the home network SID; and
    placing an international call through the network using a home international access code if the received SID is the home network SID.

11. Computer readable media embodying a program of instructions executable by a computer program to perform a method of communications, the method comprising:
    retrieving information from a network;
    determining whether the network is a home network from the retrieved information;
    receiving during registration with the network an international access code from the network when the network is not the home network; and
    placing an international call through the network using the international access code.

12. computer readable media of claim 11 wherein the information is retrieved during registration with the network.

13. The computer readable media of claim 11 wherein the retrieval of the information is in response to the activation of a key on a handset.

14. The computer readable media of claim 11 wherein the identification of the international access code is in response to the activation of a key on a handset.

15. The computer readable media of claim 11 wherein the identification of the international access code comprises mapping the information to the international access code.

16. The computer readable media of claim 11 wherein the network comprises a CDMA network.

17. A communications apparatus, comprising:
    retrieving information from a network;
    determining whether the network is a home network from the retrieved information;
    receiving during registration with the network an international access code from the network when the network is not the home network; and placing an international call through the network using the international access code.

18. communications apparatus of claim 17 wherein the retrieving means is configured to retrieve the information during registration with the network.

19. The communications apparatus of claim 17 further comprising means for initiating the international call, the retrieving means being configured to retrieve the information in response to the initiation of the international call.

20. The communications apparatus of claim 19 wherein the means for initiating the international call comprises a key.

21. The communications apparatus of claim 19 wherein the identifying means is configured to identify the international access code is in response to the initiation of the international call.

22. The communications apparatus of claim 17 wherein the identifying means comprises means for mapping the information to the international access code.

23. The communications apparatus of claim 17 wherein the network comprises a CDMA network.

24. A communications apparatus, comprising:
a memory and;
a processor configured to retrieve information from a network, determine whether the network is a home network from the retrieved information, receive during registration with the network an international access code from the network when the network is not the home network; and place an international call through the network using the international access code.

25. The communications apparatus of claim 24 wherein the memory and the processor are further configured to retrieve the information during registration with the network.

26. The communications apparatus of claim 24 further comprising a key configured to initiate the international call, the memory and the processor being responsive to the activation of the key.

27. The communications apparatus of claim 26, wherein the memory and the processor are further configured to retrieve the information in response to the activation of the key.

28. The communications apparatus of claim 26, wherein the memory and the processor are further configured to identify the international access code in response to the activation of the key.

29. The communications apparatus of claim 24, wherein the memory and the processor are further configured to identify the international access code by mapping the information to the international access code.

30. The communications apparatus of claim 24 wherein the network comprises a CDMA network.

31. The computer readable media of claim 11, wherein determining the country where the network is located from the retrieved information comprises a system parameter message.

32. The computer readable media of claim 31, wherein determining the country where the network is located from the retrieved information comprises a System Identifier (SID).

33. The computer readable media of claim 32, wherein the computer readable media further comprises:
comparing a received SID to a stored home network System Identifier (SID);
placing an international call through the network using the international access code if the received SID is different from the home network SID; and
placing an international call through the network using a home international access code if the received SID is the home network SID.

34. The communications apparatus of claim 17, wherein determining the country where the network is located from the retrieved information comprises a system parameter message.

35. The communications apparatus of claim 34, wherein determining the country where the network is located from the retrieved information comprises a System Identifier (SID).

36. The communications apparatus of claim 35, wherein the communications apparatus further comprises:
comparing a received SID to a stored home network System Identifier (SID);
placing an international call through the network using the international access code if the received SID is different from the home network SID; and
placing an international call through the network using a home international access code if the received SID is the home network SID.

* * * * *